(12) United States Patent
Fabiano et al.

(10) Patent No.: US 11,179,983 B2
(45) Date of Patent: Nov. 23, 2021

(54) TRAILER HITCH MOUNTING ASSEMBLY

(71) Applicant: MORGAN OLSON CORPORATION, Sturgis, MI (US)

(72) Inventors: Frank A. Fabiano, Bronson, MI (US); Dustin Hershberger, Wolcottville, IN (US)

(73) Assignee: MORGAN OLSON CORPORATION, Sturgis, MI (US)

( * ) Notice: Subject to any disclaimer, the term of this patent is extended or adjusted under 35 U.S.C. 154(b) by 213 days.

(21) Appl. No.: 16/508,579

(22) Filed: Jul. 11, 2019

(65) Prior Publication Data

US 2020/0016946 A1 Jan. 16, 2020

Related U.S. Application Data

(60) Provisional application No. 62/696,876, filed on Jul. 12, 2018.

(51) Int. Cl.
  *B60D 1/48* (2006.01)
  *B60D 1/58* (2006.01)
  *B60D 1/52* (2006.01)

(52) U.S. Cl.
  CPC ............... *B60D 1/485* (2013.01); *B60D 1/52* (2013.01); *B60D 1/58* (2013.01)

(58) Field of Classification Search
  None
  See application file for complete search history.

(56) References Cited

U.S. PATENT DOCUMENTS

| | | | | |
|---|---|---|---|---|
| 5,511,813 A | * | 4/1996 | Kravitz | B60D 1/42 |
| | | | | 280/495 |
| 7,021,646 B1 | * | 4/2006 | Cheng | B60D 1/485 |
| | | | | 280/493 |
| 7,690,672 B2 | * | 4/2010 | Scruggs | B60D 1/52 |
| | | | | 280/491.2 |
| 8,091,913 B1 | * | 1/2012 | White | B60D 1/44 |
| | | | | 280/468 |
| 9,738,126 B2 | * | 8/2017 | Mantovani | B60D 1/485 |
| 2011/0031718 A1 | * | 2/2011 | Di Parma | B60D 1/44 |
| | | | | 280/504 |
| 2011/0109063 A1 | * | 5/2011 | Fudala | B60D 1/485 |
| | | | | 280/497 |

FOREIGN PATENT DOCUMENTS

| | | | | |
|---|---|---|---|---|
| DE | 202010008777 U1 | * | 12/2010 | ............ B60D 1/485 |
| DE | 202016100278 U1 | * | 3/2016 | ............ B60D 1/485 |
| EP | 2607111 A1 | * | 6/2013 | ............ B60D 1/485 |
| EP | 2871081 B1 | * | 1/2017 | ............ B60D 1/485 |
| EP | 3135511 A1 | * | 3/2017 | ............ B60D 1/06 |

* cited by examiner

*Primary Examiner* — Kevin Hurley
(74) *Attorney, Agent, or Firm* — Ballard Spahr LLP

(57) ABSTRACT

An assembly for attaching a trailer hitch to a vehicle includes a cross beam to which cast parts are attached using fasteners to eliminate welded joints and their associated expense and failure modes. The components mounted on the cross beam include attachment fittings positioned at the ends of the cross beam and a hitch receiver mounted between the cross beam ends. The hitch receiver has a girth through which the cross beam extends.

29 Claims, 3 Drawing Sheets

TRAILER HITCH MOUNTING ASSEMBLY

CROSS-REFERENCE TO RELATED APPLICATION

This application claims priority to and the benefit of the filing date of U.S. Provisional Patent Application No. 62/696,876, filed on Jul. 12, 2018, which is incorporated herein by reference in its entirety.

FIELD

This invention relates to assemblies for mounting trailer hitches to vehicles.

BACKGROUND

Trailer hitch mounting assemblies according to the prior art are typically weldments. Welded joints display certain disadvantages. For example, they require skilled welders or sophisticated robotic welding machines, both of which add to the cost of production. Weld quality must be ensured by inspection techniques which also require sophisticated equipment and skilled inspectors. Weldments are furthermore made specific to a particular design, and thus lack versatility in their design and employment. There is clearly an opportunity to improve trailer hitch mounting assemblies and avoid the disadvantages of weldments.

SUMMARY

Disclosed herein is an assembly for mounting a trailer hitch to a vehicle. In one example embodiment the assembly comprises a cross beam having first and second ends oppositely disposed. A first attachment fitting is mounted on the first end of the cross beam. A second attachment fitting is mounted on the second end of the cross beam. The first and second attachment fittings are adapted to attach the cross beam to the vehicle. A hitch receiver is mounted on the cross beam between the first and second ends thereof. By way of example, the hitch receiver comprises a receptacle adapted to receive the trailer hitch. In a specific example embodiment, the hitch receiver comprises a girth having first and second ends attached to the receptacle, the girth surrounding the cross beam. Further by way of example, the hitch receiver comprises a chain plate. The chain plate defines first and second holes therethrough, the holes being positioned on opposite sides of the receiver.

In an example embodiment, the hitch receiver is attached to the cross beam using a plurality of fasteners. Further by way of example, the hitch receiver is formed of cast metal. In another example the cross beam comprises a hollow tube defining a bore. In an example embodiment the hollow tube has a rectangular cross section.

In an example embodiment of the assembly the first attachment fitting comprises a first plug received within the bore at the first end of the cross beam. A first flange extends perpendicularly from the first plug. The first flange defines a plurality of apertures for receiving fasteners for attaching the cross beam to the vehicle. By way of example the first attachment fitting is attached to the cross beam using a plurality of fasteners extending through the hollow tube and the first plug. By way of example the first attachment fitting is formed of cast metal.

In a further example of an assembly, the second attachment fitting comprises a second plug received within the bore at the second end of the cross beam. A second flange extends perpendicularly from the second plug. The second flange defines a plurality of apertures for receiving fasteners for attaching the cross beam to the vehicle. In an example embodiment the second attachment fitting is attached to the cross beam using a plurality of fasteners extending through the hollow tube and the second plug. Further by way of example, the second attachment fitting is formed of cast metal.

Also disclosed herein is a kit for constructing an assembly for mounting a trailer hitch to a vehicle. In one example embodiment the kit comprise a cross beam having first and second ends oppositely disposed. A first attachment fitting is mountable on the first end of the cross beam. A second attachment fitting is mountable on the second end of the cross beam. The first and second attachment fittings are adapted to attach the cross beam to the vehicle. A hitch receiver is mountable on the cross beam between the first and second ends thereof. Further by way of example, the hitch receiver comprises a receptacle adapted to receive the trailer hitch. In an example embodiment the hitch receiver comprises a girth having first and second ends attached to the receptacle. The girth surrounds the cross beam when the hitch receiver is mounted on the cross beam.

In a further example, the hitch receiver comprises a chain plate. The chain plate defines first and second holes therethrough, the holes being positioned on opposite sides of the receiver. An example embodiment further comprises using a plurality of fasteners for attaching the hitch receiver to the cross beam. In an example embodiment the hitch receiver is formed of cast metal. Further by way of example the cross beam comprises a hollow tube defining a bore. In a specific example embodiment the hollow tube has a rectangular cross section.

In an example embodiment the first attachment fitting comprises a first plug adapted to be received within the bore at the first end of the cross beam. A first flange extends perpendicularly from the first plug. The first flange defines a plurality of apertures for receiving fasteners for attaching the cross beam to the vehicle. An example embodiment comprises a plurality of fasteners for attaching the first attachment fitting to the cross beam. By way of example the first attachment fitting is formed of cast metal. In a further example of a kit, the second attachment fitting comprises a second plug adapted to be received within the bore at the second end of the cross beam. A second flange extends perpendicularly from the second plug. The second flange defines a plurality of apertures for receiving fasteners for attaching the cross beam to the vehicle. An example kit further comprises a plurality of fasteners for attaching the second attachment fitting to the cross beam. Additionally by way of example the second attachment fitting is formed of cast metal. An example kit may further comprise the trailer hitch.

Also disclosed herein is a method of making an assembly for mounting a trailer hitch to a vehicle. In one example embodiment the method comprises:

mounting a hitch receiver onto a cross beam;
mounting a first attachment fitting to a first end of the cross beam;
mounting a second attachment fitting to a second end of the cross beam.

By way of example an example method further comprises attaching the trailer hitch to the hitch receiver. In a particular example of a method, mounting the hitch receiver comprises sliding the cross beam through a girth having first and second ends attached to a receptacle comprising the hitch receiver. A further example comprises using a plurality of fasteners to affix the hitch receiver to the cross beam. Further by way of example, mounting the first attachment fitting to the first end of the cross beam comprises inserting a first plug comprising the first attachment fitting into a bore defined by the cross beam. Also by way of example, a method further comprises using a plurality of fasteners to affix the first attachment fitting to the first end of the cross beam. Additionally by way of example, mounting the second attachment fitting to the second end of the cross beam comprises inserting a second plug comprising the second attachment fitting into a bore defined by the cross beam. An example method embodiment comprises using a plurality of fasteners to affix the second attachment fitting to the second end of the cross beam.

DETAILED DESCRIPTION

Figure 1:
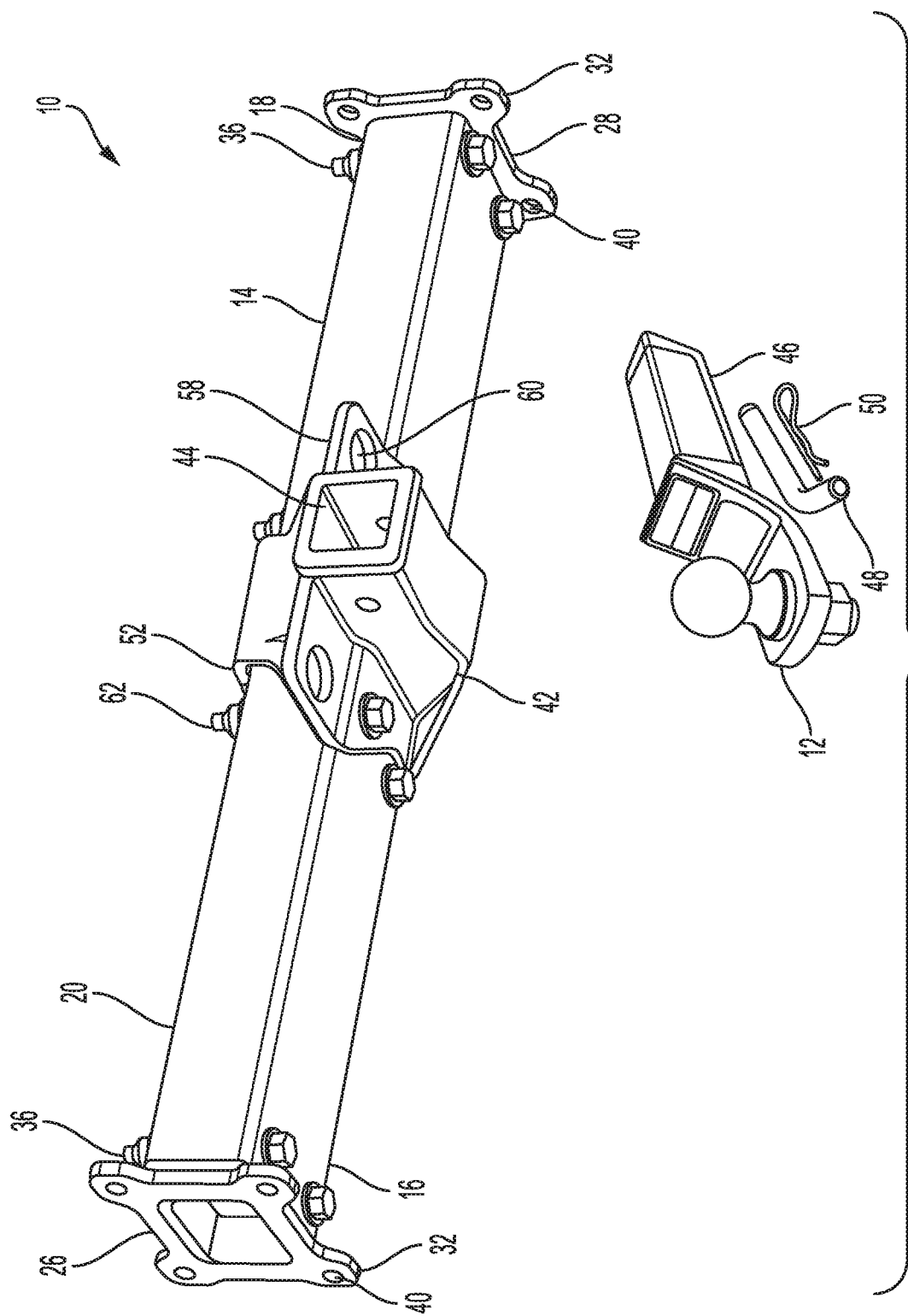
FIG. 1 is an isometric view of an example embodiment of a trailer hitch and hitch mounting assembly as disclosed herein.

The disclosed apparatus and method may be understood more readily by reference to the following detailed description of particular embodiments and the examples included therein and to the Figures and their previous and following description.

Definitions

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described. Publications cited herein and the material for which they are cited are hereby specifically incorporated by reference. Nothing herein is to be construed as an admission that the present invention is not entitled to antedate such disclosure by virtue of prior invention. No admission is made that any reference constitutes prior art. The discussion of references states what their authors assert, and applicants reserve the right to challenge the accuracy and pertinence of the cited documents. It will be clearly understood that, although a number of publications may be referred to herein, such reference does not constitute an admission that any of these documents forms part of the common general knowledge in the art.

Throughout the description and claims of this specification, the word "comprise" and variations of the word, such as "comprising" and "comprises," means "including but not limited to," and is not intended to exclude, for example, other additives, components, integers, or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers, or steps that are not listed in the step.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, and the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Trailer Hitch Mounting Assemblies

FIG. 1 shows an example embodiment of an assembly 10 for mounting a trailer hitch 12 to a vehicle (not shown). Assembly 10 comprises a cross beam 14 having first and second ends 16 and 18 oppositely disposed from one another, wherein the cross beam extends continuously between the first end and the second end. In some optional aspects, the cross beam 14 can be a straight cross beam between the first end and the second end, without bends. Cross beam 14 is advantageously a hollow tube 20 which defines a bore 22 (see FIG. 2). In this example tube 20 has a rectangular cross section 24. In a practical design, tube 20 may be formed from seamless or seamed steel tubing for strength, robustness and low cost.

Figure 2:
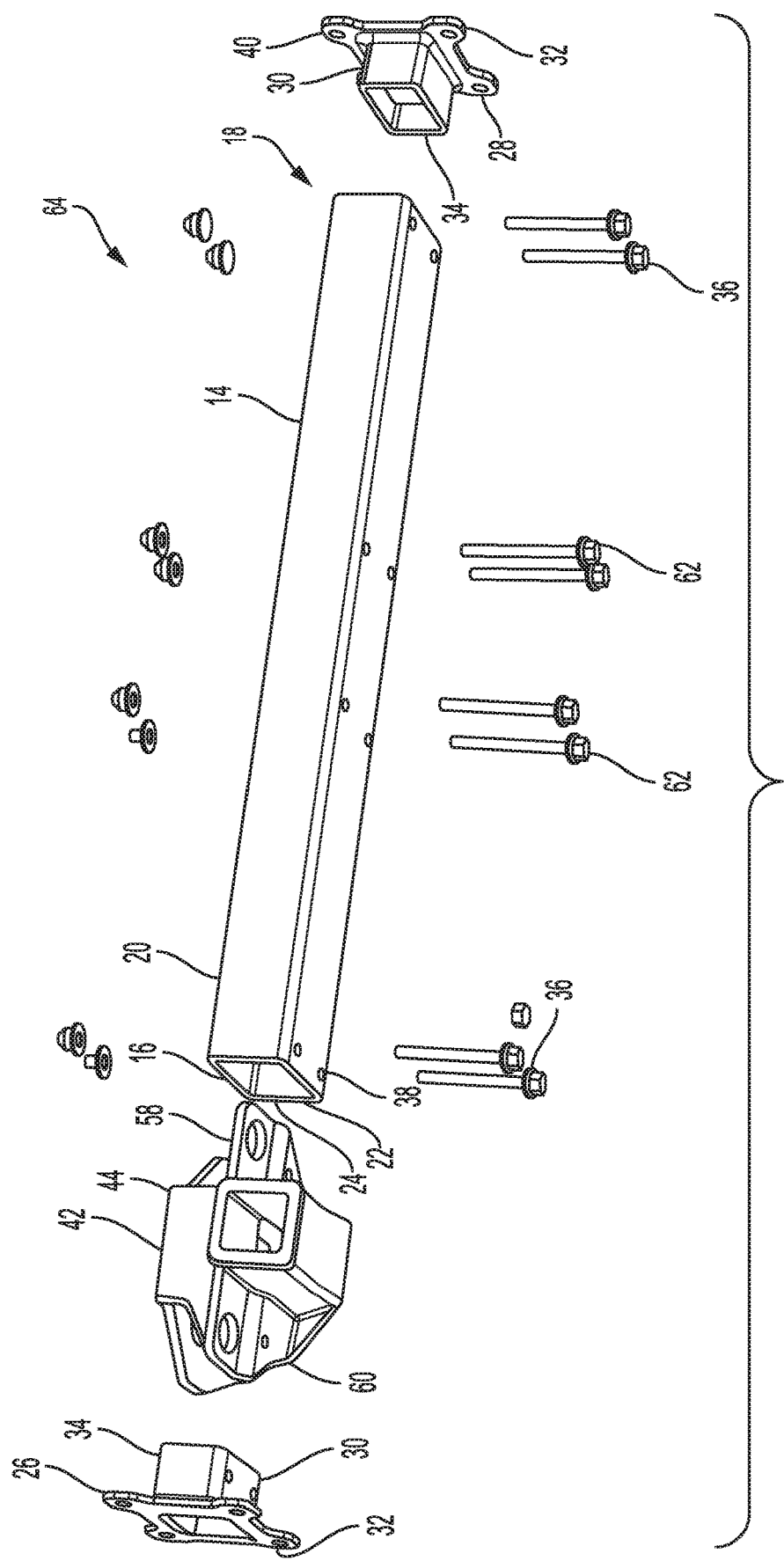
FIG. 2 is an isometric exploded view of the trailer hitch mounting assembly shown in FIG. 1 and illustrating an example method of manufacture.
Figure 3:
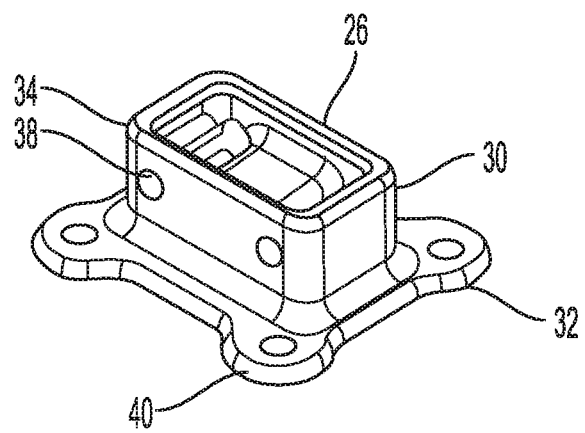
FIG. 3 is an isometric view of a fitting comprising the trailer hitch assembly shown in FIG. 1.

First and second attachment fittings 26 and 28 are mounted respectively on the first and second ends 16 and 18 of the cross beam 14. Attachment fittings 26 and 28 are adapted to attach the cross beam 14 to the vehicle. As shown in FIG. 3, each attachment fitting 26 and 28 (26 shown) comprises a plug 30 from which a flange 32 extends perpendicularly outwardly. Plug 30 is sized and shaped to fit within the bore 22 of tube 20 (FIGS. 1 and 2), and thus has a rectangular perimeter 34. It is advantageous to match the size and shape of the plug 30 to the bore 22, and different plug shapes will be used for different tubes 20. As shown in FIGS. 1 and 2, attachment fittings 26 and 28 are attached to the cross beam 14 using a plurality of fasteners 36 which extend though pre-drilled holes 38 in the cross beam 14 and the plugs 30 (see also FIG. 3). Each flange 32 defines a plurality of apertures 40 which receive additional fasteners (not shown) to attach the cross beam to the vehicle. Attachment fittings 26 and 28 are advantageously formed of cast metal such as iron or steel, but they may also be machined from a billet or metal injection molded.

Figure 4:
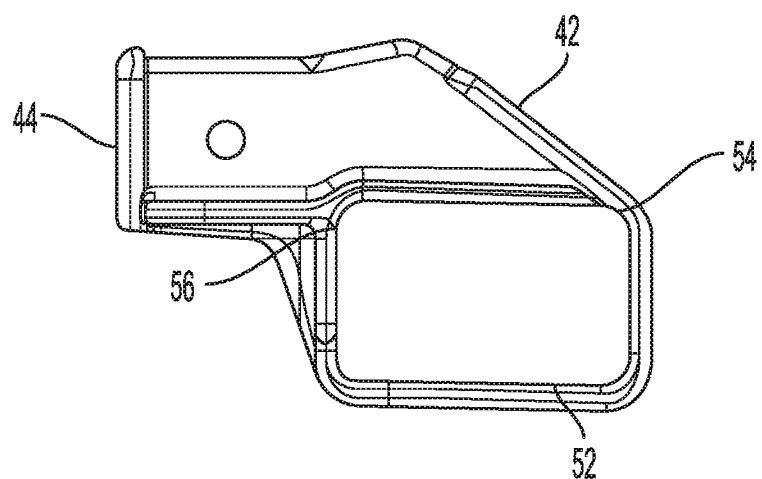
FIG. 4 is a side view of a fitting comprising the trailer hitch assembly shown in FIG. 1.

As shown in FIG. 1, a hitch receiver 42 is mounted on the cross beam 14 between the first and second ends 16 and 18. Hitch receiver 42 may also be cast from metal such as iron or steel, metal injection molded or machined from a billet. Hitch receiver 42 comprises a receptacle 44 (see also FIG. 4) adapted to receive the bar 46 of the trailer hitch 12, the bar 46 being retained within receptacle 44 by a lock pin 48 secured by a cotter pin 50 as is known in the art. As shown in FIG. 4, hitch receiver 42 also comprises a girth 52. Girth 52 has first and second ends 54 and 56 attached to the receptacle 44 so that the girth surrounds the cross beam 14 when the hitch receiver 42 is mounted thereon. Hitch receiver 42 also comprises a chain plate 58 (see FIGS. 1 and 2). Chain plate 58 defines first and second holes 60 positioned on opposite sides of the hitch receiver 42. The holes 60 receive safety chains (not shown) typically used to ensure that the trailer does not depart from the vehicle in the event of a hitch failure or malfunction. Hitch receiver 42 may be attached to the cross beam 14 using a plurality of fasteners 62.

Also disclosed herein is a kit 64 for constructing an assembly 10 for mounting a trailer hitch 12 to a vehicle, an example being shown in FIG. 2. In a practical example, kit 64 comprises cross beam 14, attachment fittings 26 and 28, hitch receiver 42 and various fasteners 36 and 62 for fixing the attachment fittings and hitch receiver to the cross beam. Kit 64 may also include the trailer hitch 12 and its lock pin 48 and cotter pin 50 shown in FIG. 1. An advantage of the kit 64 is that different components can be selected to comprise the kit to permit an assembly to fit different requirements. For example, different length cross beams 14 may be used, or different attachment fittings as well as a different hitch receivers, thereby providing great versatility. It is further advantageous to affix the components to the cross beam using fasteners, such as bolts and nuts as opposed to welding. Ensuring consistent and high quality welds in mass production is an expensive task requiring sophisticated test equipment as well as experienced personnel to perform the inspection. The welding process itself requires skilled welders and expensive welding apparatus. In comparison a bolted assembly is easier and less expensive to construct and inspect because it requires less sophisticated equipment and less skilled personnel.

Also disclosed is a method of making an assembly 10 for mounting a trailer hitch 12 on a vehicle. In one example embodiment, illustrated in FIGS. 1 and 2, the method comprises:

mounting a hitch receiver 42 onto a cross beam 14;

mounting a first attachment fitting 26 to a first end 16 of the cross beam; and mounting a second attachment fitting 28 to a second end 18 of the cross beam.

The method may further include attaching the trailer hitch 12 to the hitch receiver 42.

The step of mounting the hitch receiver 42 to the cross beam 14 may comprise sliding the cross beam 14 through a girth 52 having first and second ends 54 and 56 attached to a receptacle 44 comprising the hitch receiver 42. The first end 16 of the cross beam 14 can be inserted through the girth 52 until the girth is positioned between the first end 16 and the second end 18 of the cross beam. Accordingly, the girth 52 can be configured to receive the first end 16 of cross beam 14 and slide along the cross beam until the girth is positioned between the first end and the second end 18 of the cross beam. In the example method a plurality of fasteners 62 may be used to affix the hitch receiver 42 to the cross beam 14. The step of mounting the first attachment fitting 26 to the first end 16 of the cross beam 14 may comprise inserting a first plug 30 comprising the first attachment fitting 26 into a bore 22 defined by the cross beam 14. A plurality of fasteners 36 may be used to affix the first attachment fitting 26 to the first end 16 of the cross beam 14. A second attachment fitting 28 may be attached to the second end 18 of the cross beam 14 by inserting a second plug 30 comprising the second attachment fitting 28 into the bore 22 defined by the cross beam. A plurality of fasteners 36 may be used to affix the second attachment fitting 28 to the second end 18 of the cross beam 14.

Assemblies 10 for mounting trailer hitches 12 to vehicles are expected to provide various advantages over welded structures. The advantages include greater versatility in application, more economic fabrication and inspection, and elimination of stress and fatigue failure modes associated exclusively with weldments.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An assembly for mounting a trailer hitch to a vehicle, said assembly comprising: a cross beam having first and second ends oppositely disposed; a first attachment fitting mounted on said first end of said cross beam; a second attachment fitting mounted on said second end of said cross beam, said first and second attachment fittings adapted to attach said cross beam to said vehicle; a hitch receiver mounted on said cross beam between said first and second ends thereof.

Aspect 2: The assembly according to aspect 1, wherein said hitch receiver comprises a receptacle adapted to receive said trailer hitch.

Aspect 3: The assembly according to aspect 2, wherein said hitch receiver comprises a girth having first and second ends attached to said receptacle, said girth surrounding said cross beam.

Aspect 4: The assembly according to any of the previous aspects, wherein said hitch receiver comprises a chain plate, said chain plate defining first and second holes therethrough, said holes being positioned on opposite sides of said receiver.

Aspect 5: The assembly according to any of the previous aspects, wherein said hitch receiver is attached to said cross beam using a plurality of fasteners.

Aspect 6: The assembly according to any of the previous aspects, wherein said hitch receiver is formed of cast metal.

Aspect 7: The assembly according to any of the previous aspects, wherein said cross beam comprises a hollow tube defining a bore.

Aspect 8: The assembly according to aspect 7, wherein said hollow tube has a rectangular cross section.

Aspect 9: The assembly according to aspect 7 or aspect 8, wherein said first attachment fitting comprises: a first plug received within said bore at said first end of said cross beam; a first flange extending perpendicularly from said first plug, said first flange defining a plurality of apertures for receiving fasteners for attaching said cross beam to said vehicle.

Aspect 10: The assembly according to aspect 9, wherein said first attachment fitting is attached to said cross beam using a plurality of fasteners extending through said hollow tube and said first plug.

Aspect 11: The assembly according to aspect 9 or aspect 10, wherein said first attachment fitting is formed of cast metal.

Aspect 12: The assembly according to any of aspects 7-11, wherein said second attachment fitting comprises: a second plug received within said bore at said second end of said cross beam; a second flange extending perpendicularly from said second plug, said second flange defining a plurality of apertures for receiving fasteners for attaching said cross beam to said vehicle.

Aspect 13: The assembly according to aspect 12, wherein said second attachment fitting is attached to said cross beam using a plurality of fasteners extending through said hollow tube and said second plug.

Aspect 14: The assembly according to aspect 12 or aspect 13, wherein said second attachment fitting is formed of cast metal.

Aspect 15: A kit for constructing an assembly for mounting a trailer hitch to a vehicle, said kit comprising: a cross beam having first and second ends oppositely disposed; a first attachment fitting mountable on said first end of said cross beam; a second attachment fitting mountable on said second end of said cross beam, said first and second attachment fittings adapted to attach said cross beam to said vehicle; a hitch receiver mountable on said cross beam between said first and second ends thereof.

Aspect 16: The kit according to aspect 15, wherein said hitch receiver comprises a receptacle adapted to receive said trailer hitch.

Aspect 17: The kit according to aspect 16, wherein said hitch receiver comprises a girth having first and second ends attached to said receptacle, said girth surrounding said cross beam when said hitch receiver is mounted on said cross beam.

Aspect 18: The kit according to any of aspects 15-17, wherein said hitch receiver comprises a chain plate, said chain plate defining first and second holes therethrough, said holes being positioned on opposite sides of said receiver.

Aspect 19: The kit according to any of aspects 15-18, further comprising using a plurality of fasteners for attaching said hitch receiver to said cross beam.

Aspect 20: The kit according to any of aspects 15-19, wherein said hitch receiver is formed of cast metal.

Aspect 21: The kit according to any of aspects 15-20, wherein said cross beam comprises a hollow tube defining a bore.

Aspect 22: The kit according to aspect 21, wherein said hollow tube has a rectangular cross section.

Aspect 23: The kit according to aspect 21 or aspect 22, wherein said first attachment fitting comprises: a first plug adapted to be received within said bore at said first end of said cross beam; a first flange extending perpendicularly from said first plug, said first flange defining a plurality of apertures for receiving fasteners for attaching said cross beam to said vehicle.

Aspect 24: The kit according to aspect 23, further comprising a plurality of fasteners for attaching said first attachment fitting to said cross beam.

Aspect 25: The kit according to aspect 23 or aspect 24, wherein said first attachment fitting is formed of cast metal.

Aspect 26: The kit according to any of aspects 21-25, wherein said second attachment fitting comprises: a second plug adapted to be received within said bore at said second end of said cross beam; a second flange extending perpendicularly from said second plug, said second flange defining a plurality of apertures for receiving fasteners for attaching said cross beam to said vehicle.

Aspect 27: The kit according to aspect 26, further comprising a plurality of fasteners for attaching said second attachment fitting to said cross beam.

Aspect 28: The kit according to aspect 26 or aspect 27, wherein said second attachment fitting is formed of cast metal.

Aspect 29: The kit according to any of aspects 15-28, further comprising said trailer hitch.

Aspect 30: A method of making an assembly for mounting a trailer hitch to a vehicle, said method comprising: mounting a hitch receiver onto a cross beam; mounting a first attachment fitting to a first end of said cross beam; mounting a second attachment fitting to a second end of said cross beam.

Aspect 31: The method according to aspect 30, further comprising attaching said trailer hitch to said hitch receiver.

Aspect 32: The method according to aspect 30 or aspect 31, wherein mounting said hitch receiver comprises sliding said cross beam through a girth having first and second ends attached to a receptacle comprising said hitch receiver.

Aspect 33: The method according to aspect 32, further comprising using a plurality of fasteners to affix said hitch receiver to said cross beam.

Aspect 34: The method according to any of aspects 30-33, wherein mounting said first attachment fitting to said first end of said cross beam comprises inserting a first plug comprising said first attachment fitting into a bore defined by said cross beam.

Aspect 35: The method according to aspect 34, further comprising using a plurality of fasteners to affix said first attachment fitting to said first end of said cross beam.

Aspect 36: The method according to any of aspects 30-35, wherein mounting said second attachment fitting to said second end of said cross beam comprises inserting a second plug comprising said second attachment fitting into a bore defined by said cross beam.

Aspect 37: The method according to aspect 36, further comprising using a plurality of fasteners to affix said second attachment fitting to said second end of said cross beam.

Although the foregoing invention has been described in some detail by way of illustration and example for purposes of clarity of understanding, certain changes and modifications may be practiced within the scope of the appended claims.

What is claimed is:

1. An assembly for mounting a trailer hitch to a vehicle, said assembly comprising:
   a cross beam having first and second ends oppositely disposed, wherein the cross beam extends continuously between the first and second ends;
   a first attachment fitting mounted on said first end of said cross beam;
   a second attachment fitting mounted on said second end of said cross beam, said first and second attachment fittings adapted to attach said cross beam to said vehicle; and
   a hitch receiver mounted on said cross beam between said first and second ends thereof, wherein the hitch receiver comprises a receptacle adapted to receive said trailer hitch, wherein the hitch receiver comprises a girth having first and second ends attached to said receptacle, said girth surrounding said cross beam, wherein the hitch receiver does not couple to the cross beam via weld.

2. The assembly according to claim 1, wherein said hitch receiver comprises a chain plate, said chain plate defining first and second holes therethrough, said holes being positioned on opposite sides of said receiver.

3. The assembly according to claim 1, wherein said hitch receiver is attached to said cross beam using a plurality of fasteners.

4. The assembly according to claim 1, wherein said hitch receiver is formed of metal.

5. The assembly according to claim 1, wherein said cross beam comprises a hollow tube defining a bore.

6. The assembly according to claim 5, wherein said hollow tube has a rectangular cross section.

7. The assembly according to claim 5, wherein said first attachment fitting comprises:
   a first plug received within said bore at said first end of said cross beam;
   a first flange extending perpendicularly from said first plug, said first flange defining a plurality of apertures for receiving fasteners for attaching said cross beam to said vehicle.

8. The assembly according to claim 7, wherein said first attachment fitting is attached to said cross beam using a plurality of fasteners extending through said hollow tube and said first plug.

9. The assembly according to claim 7, wherein said first attachment fitting is formed of metal.

10. The assembly according to claim 5, wherein said second attachment fitting comprises:
    a second plug received within said bore at said second end of said cross beam;
    a second flange extending perpendicularly from said second plug, said second flange defining a plurality of apertures for receiving fasteners for attaching said cross beam to said vehicle.

11. The assembly according to claim 10, wherein said second attachment fitting is attached to said cross beam using a plurality of fasteners extending through said hollow tube and said second plug.

12. The assembly according to claim 10, wherein said second attachment fitting is formed of metal.

13. The assembly of claim 1, wherein the cross beam is straight from the first end to the second end.

14. The assembly of claim 1, wherein prior to mounting the hitch receiver on said cross beam between said first and second ends thereof, the girth of the hitch receiver is slid over the first end of the cross beam to position the hitch receiver between the first and second ends of the cross beam.

15. A kit for constructing an assembly for mounting a trailer hitch to a vehicle, said kit comprising:
    a cross beam having first and second ends oppositely disposed;
    a first attachment fitting mountable on said first end of said cross beam;
    a second attachment fitting mountable on said second end of said cross beam, said first and second attachment fittings adapted to attach said cross beam to said vehicle;
    a hitch receiver mountable on said cross beam between said first and second ends thereof, wherein said hitch receiver comprises a receptacle adapted to receive said trailer hitch, wherein said hitch receiver comprises a girth having first and second ends attached to said receptacle, said girth surrounding said cross beam when said hitch receiver is mounted on said cross beam, wherein the girth is configured to receive the first end of cross beam and slide along the cross beam until the girth is positioned between the first end and the second end of the cross beam.

16. The kit according to claim 15, wherein said hitch receiver comprises a chain plate, said chain plate defining first and second holes therethrough, said holes being positioned on opposite sides of said receiver.

17. The kit according to claim 15, further comprising using a plurality of fasteners for attaching said hitch receiver to said cross beam.

18. The kit according to claim 15, wherein said hitch receiver is formed of metal.

19. The kit according to claim 15, wherein said cross beam comprises a hollow tube defining a bore.

20. The kit according to claim 19, wherein said hollow tube has a rectangular cross section.

21. The kit according to claim 19, wherein said first attachment fitting comprises:
    a first plug adapted to be received within said bore at said first end of said cross beam;
    a first flange extending perpendicularly from said first plug, said first flange defining a plurality of apertures for receiving fasteners for attaching said cross beam to said vehicle.

22. The kit according to claim 21, further comprising a plurality of fasteners for attaching said first attachment fitting to said cross beam.

23. The kit according to claim 21, wherein said first attachment fitting is formed of metal.

24. The kit according to claim 19, wherein said second attachment fitting comprises:
    a second plug adapted to be received within said bore at said second end of said cross beam;

a second flange extending perpendicularly from said second plug, said second flange defining a plurality of apertures for receiving fasteners for attaching said cross beam to said vehicle.

25. The kit according to claim 24, further comprising a plurality of fasteners for attaching said second attachment fitting to said cross beam.

26. The kit according to claim 24, wherein said second attachment fitting is formed of metal.

27. The kit according to claim 15, further comprising said trailer hitch.

28. The kit according to claim 15, wherein the cross beam is straight from the first end to the second end.

29. A method of making an assembly for mounting a trailer hitch to a vehicle, said method comprising:
   sliding a girth of a hitch receiver over a first end of a cross beam;
   mounting the hitch receiver onto the cross beam between the first end and an opposed second end of the cross beam;
   mounting a first attachment fitting to a first end of said cross beam; and
   mounting a second attachment fitting to a second end of said cross beam.

* * * * *